(12) United States Patent
Ohnaka et al.

(10) Patent No.: US 8,727,429 B2
(45) Date of Patent: May 20, 2014

(54) FRONT PORTION STRUCTURE OF VEHICLE BODY

(71) Applicant: Honda Motor Co., Ltd, Tokyo (JP)

(72) Inventors: Ryo Ohnaka, Wako (JP); Yoshinori Taguchi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/757,962

(22) Filed: Feb. 4, 2013

(65) Prior Publication Data

US 2013/0249248 A1 Sep. 26, 2013

(30) Foreign Application Priority Data

Mar. 26, 2012 (JP) ................. 2012-069416

(51) Int. Cl.
*B60J 7/00* (2006.01)
*B62D 21/15* (2006.01)
*B62D 25/08* (2006.01)

(52) U.S. Cl.
CPC ............ *B62D 21/152* (2013.01); *B62D 25/082* (2013.01)
USPC .................................... 296/203.02

(58) Field of Classification Search
CPC ..... B62D 21/152; B62D 25/08; B62D 25/082
USPC .................. 296/203.02, 204, 187.01, 203.01
See application file for complete search history.

(56) References Cited

U.S. PATENT DOCUMENTS

| | | | | |
|---|---|---|---|---|
| 5,244,248 A | * | 9/1993 | Bovellan | 296/187.09 |
| 5,718,048 A | * | 2/1998 | Horton et al. | 29/897.2 |
| 5,855,394 A | * | 1/1999 | Horton et al. | 280/781 |
| 5,873,587 A | * | 2/1999 | Kawabe et al. | 280/124.135 |
| 5,915,494 A | * | 6/1999 | Matsumura et al. | 180/232 |
| 6,948,769 B2 | * | 9/2005 | Borkowski et al. | 296/203.02 |
| 7,296,824 B2 | * | 11/2007 | Yasui et al. | 280/784 |
| 7,380,830 B2 | * | 6/2008 | Mitsui et al. | 280/784 |
| 7,393,016 B2 | * | 7/2008 | Mitsui et al. | 280/784 |
| 7,614,684 B2 | * | 11/2009 | Yasuhara et al. | 296/187.09 |
| 7,976,037 B2 | * | 7/2011 | Yoshida et al. | 280/124.109 |
| 8,128,160 B2 | * | 3/2012 | Leanza et al. | 296/203.02 |
| 8,459,728 B2 | * | 6/2013 | Fujii et al. | 296/203.02 |
| 8,480,102 B2 | * | 7/2013 | Yamada et al. | 280/124.109 |

(Continued)

FOREIGN PATENT DOCUMENTS

| | | |
|---|---|---|
| JP | 6-135355 A | 5/1994 |
| JP | 7-149255 A | 6/1995 |
| JP | 2005-199741 A | 7/2005 |

*Primary Examiner* — Kiran B Patel (74) *Attorney, Agent, or Firm* — Westerman, Hattori, Daniels & Adrian, LLP (57) ABSTRACT

With a structure for a front portion of a vehicle body, a front side frame has a front side frame main unit of which a cross-sectional shape is generally hat-shaped and of which an opening faces the outer direction where a front wheel is placed, a back plate forming a closed cross-section with the inner face of the front side frame main unit being layered with and joined with a flange facing toward the outer direction, and a tire clearance portion formed in a curved shape to correspond to steering range of the front wheels. A sidewall is formed into a sidewall straight portion in an approximately straight line from the tip of the front side frame to the middle including the tire clearance portion. The flange has a flange straight portion formed to the tire clearance portion, approximately parallel with the sidewall straight portion of the sidewall.

8 Claims, 12 Drawing Sheets

(56) References Cited

U.S. PATENT DOCUMENTS

| | | |
|---|---|---|
| 8,490,988 B2* | 7/2013 | Takeshita et al. ...... 280/124.109 |
| 2005/0082877 A1* | 4/2005 | Gotou et al. .................. 296/204 |
| 2012/0119546 A1* | 5/2012 | Honda et al. ............. 296/203.01 |
| 2013/0088049 A1* | 4/2013 | Mazur et al. .................. 296/204 |
| 2013/0113238 A1* | 5/2013 | Mildner et al. ............... 296/204 |
| 2013/0221709 A1* | 8/2013 | Mildner ................... 296/203.04 |
| 2013/0264843 A1* | 10/2013 | Toba ............................. 296/204 |

\* cited by examiner

FIG. 15

FRONT PORTION STRUCTURE OF VEHICLE BODY

CROSS REFERENCES TO RELATED APPLICATIONS

The present application claims priority under 35 U.S.C. §119 to Japanese Patent Application No. 2012-069416, filed Mar. 26, 2012, entitled "Front Portion Structure of Vehicle Body." The contents of this application are incorporated herein by reference in their entirety.

TECHNICAL FIELD

The present disclosure relates to a front portion structure of a vehicle body where right and left front side frames are extended from the floor of the passenger space toward the front of the vehicle.

BACKGROUND

Heretofore, there has been proposed a structure for a front portion of a vehicle body, where a flange which is an edge of an inner panel with a groove shape is layered with a flange of an outer panel, these are joined together to form a closed cross-section shape, these flanges are bent from the edge to the middle in the width of the front side frame, and extended at the middle in the longitudinal direction of the front side frame. This front side frame is capable of absorbing shock according to a predetermined deformation pattern in a sure manner (e.g., see Japanese Unexamined Patent Application Publication No. 6-135355).

There has also been proposed a structure where, of the layered and joined flanges, the tip flanges where the load is input are bent in a crank shape, so the tip flanges do not peel away from each other but rather deform in a wave-like shape, and this wave-like shape is propagated throughout the remaining flanges, whereby energy absorption at the time of collision can be improved (e.g., see Japanese Unexamined Patent Application Publication No. 2005-199741).

Further, there has been proposed a structure where a bulkhead is provided within the front side frame at a position matching a joint with a cross member, whereby the front side frame behind the position where the bulkhead has been provided can be allowed to compress and deform in a stable manner (e.g., see Japanese Unexamined Patent Application Publication No. 7-149255).

Through diligent study, the inventors found the following problems. With the related art according to Japanese Unexamined Patent Application Publication No. 6-135355, upon a load being input due to the front of the vehicle colliding with an object, it is conceivable that bending will first start from the portion where the flanges have been bent, so the bending positions are limited, and there is little freedom in design. With the arrangements disclosed in Japanese Unexamined Patent Application Publication Nos. 2005-199741 and 7-149255, the front side frame compresses and deforms in wave-like shapes in order, so there is little freedom in design.

For example, there is an arrangement for a front side frame where, upon a shock load being input from the front, the front side frame is bent at three positions, thereby absorbing the shock. With the front side frame, there is the need to form tire clearance portions to increase the steering angle of the front wheels, and the need to curve the font side frame so as to mount an engine with an east-west (transverse) layout, and so forth. This means that the shape of the front side frame is not uniform but bent, so causing bending load to occur at the predetermined bend positions might be achieved by adding reinforcing members near other bending positions so as to set difference in strength, but smoothly bending the three bending positions in order is difficult. Moreover, adding reinforcing members leads in increased weight and costs for the front side frame.

SUMMARY

It has been found desirable to provide a structure for a front portion of a vehicle body where the three positions of the front side frames can be smoothly bent even with tire clearance portions formed to the front side frames, thereby improving shock absorption.

According to an aspect of the present disclosure, a front portion structure of a vehicle body comprises a front side frame extending forward from a front portion of a floor of a passenger space and disposed close to a front wheel, the front side frame includes: a front side frame main unit including a substantially hat shape in cross-section wherein the hat shape includes a flange and an opening facing an outer direction in a vehicle width direction where a front wheel is placed, a back plate layered with and joined with the flange facing toward the outer direction to form a closed cross-section with the front side frame main unit, a tire clearance portion formed in a curved shape corresponding to steering of the front wheel, and a bulkhead disposed at the rear of the tire clearance portion within the closed cross-section of the front side frame, wherein the front side frame main unit includes a sidewall facing the opening and formed in an substantially straight line from a front end of the front side frame main unit to a middle portion including the tire clearance portion, and wherein the flange includes a flange straight portion formed in the tire clearance portion, substantially parallel with the sidewall.

With this configuration, the front side frame includes: a front side frame main unit including a substantially hat shape in cross-section wherein the hat shape includes a flange and an opening facing the outer direction, a back plate layered with and joined with the flange facing toward the outer direction to form a closed cross-section with the front side frame main unit, a tire clearance portion formed in a curved shape corresponding to steering of the front wheel. The front side frame main unit includes a sidewall facing the opening and formed in a substantially straight line from a front end of the front side frame main unit to a middle portion including the tire clearance portion, and the flange includes a flange straight portion formed in the tire clearance portion, substantially parallel with the sidewall. Also, the bulkhead is disposed at the rear of the tire clearance portion within the closed cross-section of the front side frame. This arrangement is advantageous in that, upon load (shock) input to the front of the vehicle being transmitted to the front side frame, the load is not as readily concentrated at the flange straight portion as compared with a case where the flange is formed as a curved shape within the range of the tire clearance portion.

Specifically, while the tire clearance portion includes the locally curved shape following the shape of the tire, a certain range of the flange is linearly formed instead of forming the shape of the flange of the front side frame into the locally curved shape, thereby avoiding concentration of stress to the tire clearance portion. Consequently, in the tire clearance portion, a hard-to-bend front side frame, of which the timing of bending is delayed as compared to the timing of the starting to bend of the bend portion of the front side frame set behind the tire clearance portion, can be formed.

Further, the bulkhead is disposed within the closed cross-section close to the bend portion (middle bend portion), whereby collapsing (compression) of the closed cross-section (hollow) near the bend portion (middle bend portion) which occurs at the time of the front side frame being bent is suppressed, and the load which acts in the bending direction, and occurs during the process of being bent and folded from the bend portion (middle bend portion), can be increased.

Accordingly, even with an arrangement where a tire clearance portion is provided to the front side frame, the front side frame can be smoothly bent at portions other than the tire clearance portion during a front-end collision, and collision absorption can be improved. Further, all that is involved is to change the flange in the range of the tire clearance portion, and dispose a bulkhead, so the structure is simplified, there is no need for extra reinforcing members, and reduction in weight can be realized.

An arrangement may be made wherein the back plate includes a curved shape in the tire clearance portion, formed by pressing the back plate in toward the inner side of the front side frame main unit so as to be recessed such that the shape of the closed cross-section of the tire clearance portion includes a substantially triangular shape such that a width of the shape of the closed cross-section tapers toward the downward direction thereof, and wherein the flange includes an upper joint flange extending upwards, and a lower joint flange extending downwards and including the flange straight portion and a flange transition portion continuously disposed between the flange straight portion and a remaining lower joint flange.

With this configuration, the back plate includes a curved shape in the tire clearance portion, formed by pressing the back plate in toward the inner side of the front side frame main unit so as to be recessed such that the shape of the closed cross-section of the tire clearance portion includes a substantially triangular shape such that a width of the shape of the closed cross-section tapers toward the downward direction thereof, and wherein the flange includes an upper joint flange extending upwards, and a lower joint flange extending downwards and including the flange straight portion and a flange transition portion continuously disposed between the flange straight portion and a remaining lower joint flange. Accordingly, the steering angle of the front wheels can made greater even with an FF layout (front-engine, front-wheel-drive layout) automobile of which front wheels are driven having an east-west mounted engine. Moreover, concentration of stress at the tire clearance portion can be avoided, so that the tire clearance portion does not readily bend.

The front side frame main unit may include a top portion disposed continuous with the sidewall, and a bottom portion opposite to the top portion and disposed continuous with the sidewall, and the bulkhead is disposed around a middle bend portion of the front side frame, and is joined with the sidewall, the top portion, and the bottom portion.

According to this configuration, the front side frame main unit includes a top portion disposed continuous with the sidewall, and a bottom portion opposite to the top portion and disposed continuous with the sidewall, and the bulkhead is disposed around a middle bend portion of the front side frame, and is joined with the sidewall, the top portion, and the bottom portion. Accordingly, collapse (compression) of the closed cross-section occurring at the time the front side frame being bent and folded from the bend portion (middle bend portion) can be suppressed in a more sure manner, and the load which acts in the bending direction and occurs during the bending process can be increased in a more sure manner.

The front side frame may include a base curved portion disposed at a back portion of the front side frame around the passenger space, the base curved portion being formed by an inward recess, the center of the radius of the curvature thereof being placed on the outer side where the front wheel is disposed, with the base curved portion being formed such that the cross-sectional area of the closed cross-section gradually expands toward the passenger space.

According to this configuration, the front side frame includes a base curved portion disposed at a back portion of the front side frame around the passenger space, the base curved portion being formed by an inward recess, the center of the radius of the curvature thereof being placed on the outer side where the front wheel is disposed, with the base curved portion being formed such that the cross-sectional area of the closed cross-section gradually expands toward the passenger space. Accordingly, the bending strength of the base curved portion can be made greater than the bending strength of the middle bend portion, so the middle bend portion is bent prior to the base curved portion, with the bending of the middle bend portion serving as a trigger (starting point) following which the tire clearance portion provided in front of the middle bend portion and the base curved portion provided back of the middle bend portion start to bend, such that bending of these three points proceeds smoothly, and the amount of collision load absorbed from a front-end collision can be increased.

The upper joint flange may be set such that a distance from the sidewall within the range of the tire clearance portion is longer than a distance from the sidewall to the flange straight portion of the lower joint flange.

According to this configuration, the upper joint flange is set such that the distance from the sidewall within the range of the tire clearance portion is longer than the distance from the sidewall to the flange straight portion of the lower joint flange. Accordingly, the area of the flat face of the top portion which is continuous with the upper joint flange can be increased, thereby increasing space to place parts to be mounted to the vehicle.

An arrangement may be made wherein the front side frame includes an upper ridge portion and a lower ridge portion which are the corners of the sidewall of the front side frame main unit viewed from directly above or directly below, respectively, the upper ridge portion and the lower ridge portion form a front straight line portion extending substantially in a straight line from the front end of the front side frame, and a curved portion curved toward the direction where the sidewall faces, with a back straight line portion formed continuously with the upper ridge portion and the lower ridge portion of the curved portion and extending substantially in a straight line, such that the back straight line portion is continuous with a floor frame of the floor.

According to this configuration, the front side frame has an upper ridge portion and lower ridge portion which are the corners of the sidewall of the front side frame main unit, to form a front straight line portion extending substantially in a straight line from the front end of the front side frame, and a curved portion curved toward the direction where the sidewall faces, with a back straight line portion formed continuously with the upper ridge portion and the lower ridge portion of the curved portion and extending substantially in a straight line, such that the back straight line portion is continuous with a floor frame of the floor. Accordingly, the load input at the time of a front-end collision can be smoothly transmitted form the front side frame to the floor frame, thereby generating sufficient reactive force.

BRIEF DESCRIPTION OF THE DRAWINGS

The advantages of the disclosure will become apparent in the following description taken in conjunction with the following drawings.

DETAILED DESCRIPTION

Figure 1:
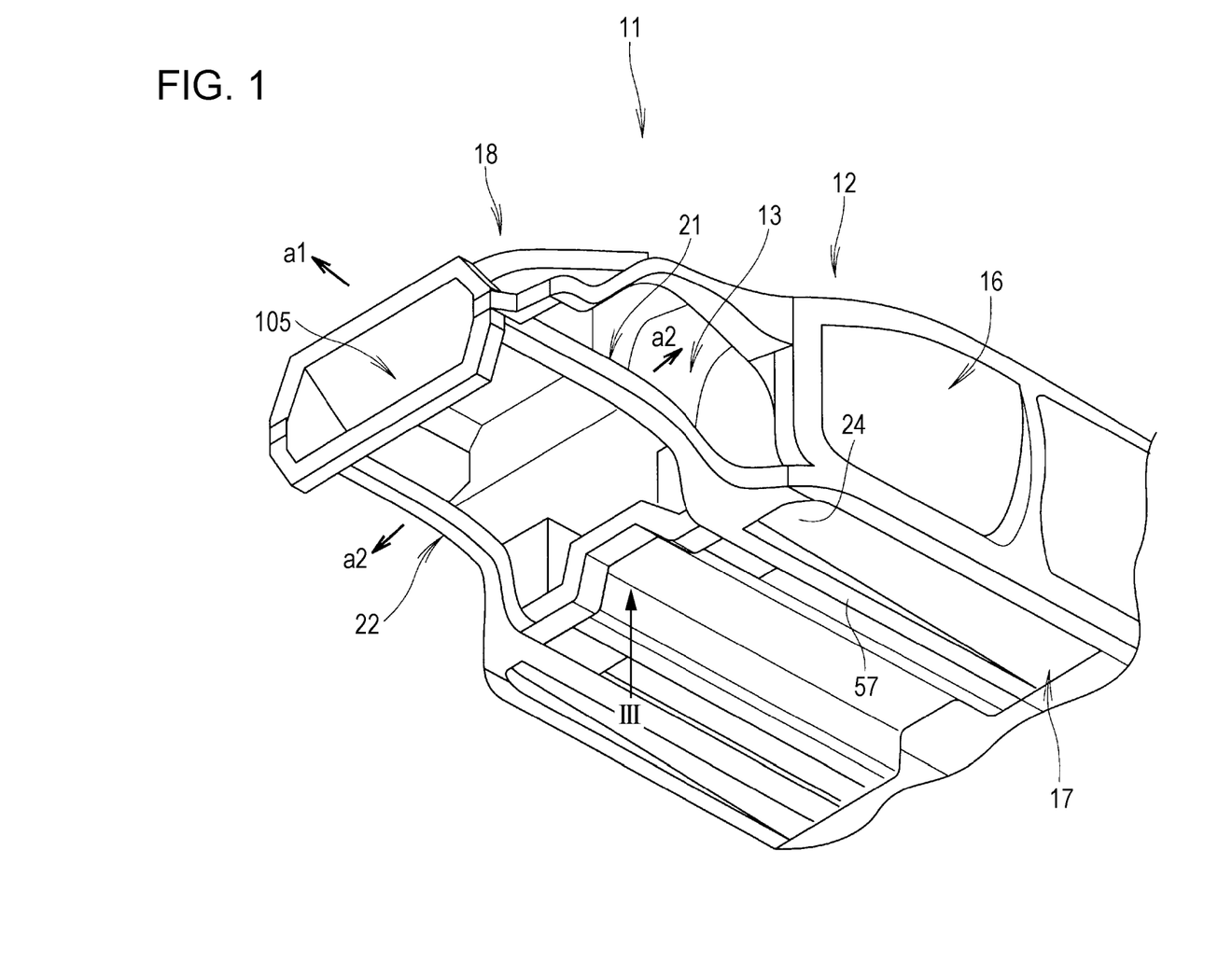
FIG. 1 is a perspective view illustrating the overview of the front portion of a vehicle which employing a structure for a front portion of a vehicle body according to an embodiment of the present disclosure.
Figure 2:
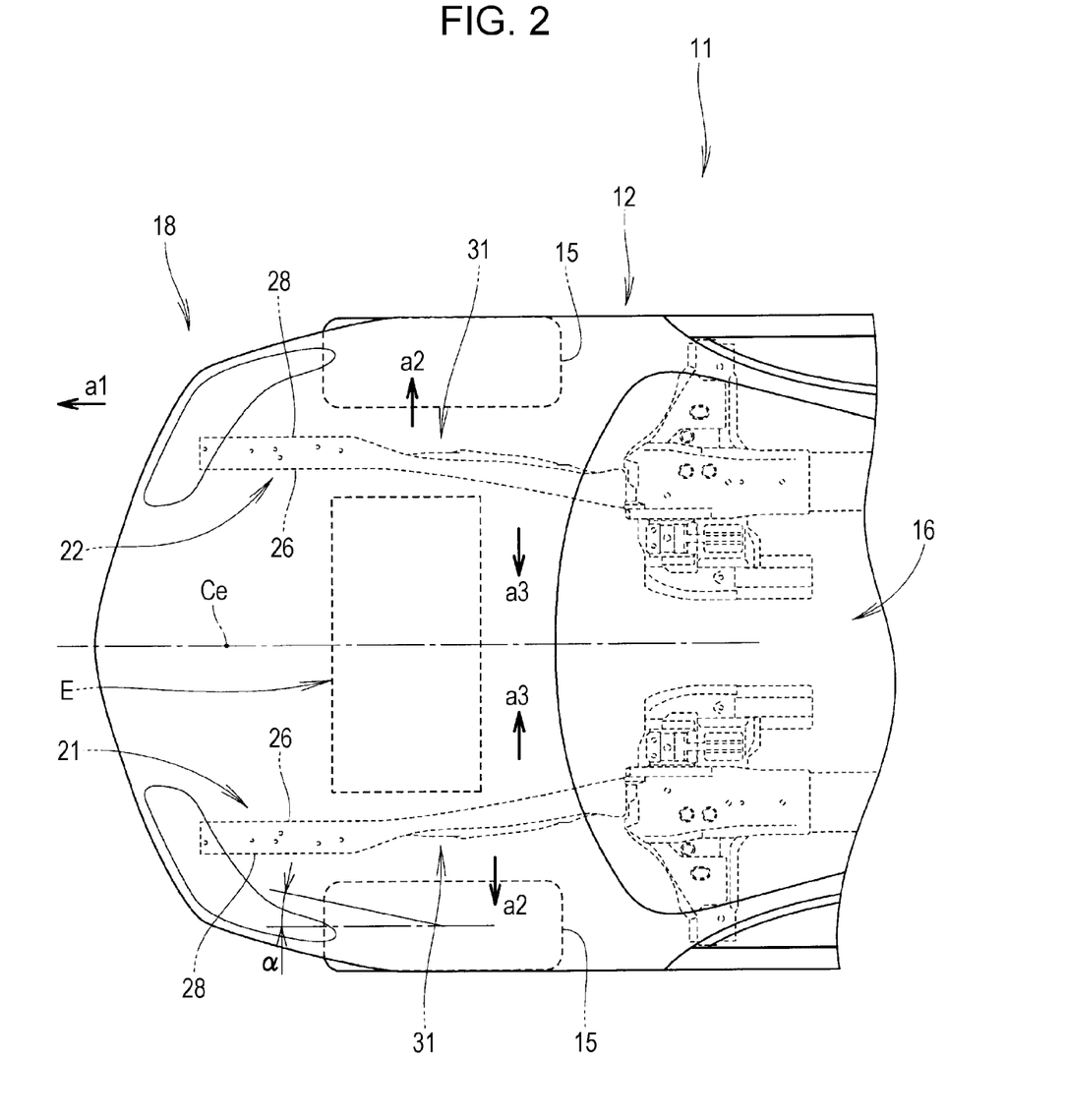
FIG. 2 is a plan view illustrating an overview of the front portion of a vehicle which employing a structure for a front portion of a vehicle body according to an embodiment of the present disclosure.

An embodiment of the present disclosure will be described in detail. As illustrated in FIGS. 1 and 2, a vehicle 11 employs a front portion structure of a vehicle body (vehicle body front portion mechanism 13) according to the embodiment for a vehicle body 12. The vehicle 11 is an FF layout (front-engine, front-wheel-drive layout) automobile of which front wheels 15 are driven, with a relatively great steering angle α for the front wheels 15 being set. E denotes an east-west mounted engine.

The vehicle body 12 includes an underbody 17 forming the floor of a passenger space 16, a front body 18, and front side frames 21 and 22 which are at the left and right of the front body 18, respectively. The front side frames 21 and 22 are also included in the front portion structure of a vehicle body (vehicle body front portion mechanism 13).

Next, primary configurations of the front portion structure of a vehicle body will be described with reference to FIGS. 1 through 14. FIGS. 8 through 12 are cross-sectional views of the front side frame 21, with the left side in FIGS. 8 through 12 corresponding to the downward direction of the front side frame 21 and the right side in FIGS. 8 through 12 corresponding to the upward direction of the front side frame 21. Note that FIG. 5 and FIGS. 8 through 13 are enlarged diagrams of cross-sectional views.

The front portion structure of a vehicle body of the vehicle 11, i.e., the automobile, extends forward (in the direction of the arrow a1) from a front portion 24 of the underbody 17 (floor) of the passenger space 16, and has front side frames 21 and 22 which come close to each of left and right front wheels 15. Note that the front side frame 21 and the front side frame 22 are approximately symmetrical.

With this structure for a front portion of a vehicle body, the front side frame 21 has a front side frame main unit 26 of which a cross-sectional shape is generally hat-shaped and of which an opening 25 faces the outer direction where a front wheel 15 is placed (the direction of the arrow a2), a back plate 28 forming a closed cross-section by layered with and joined with a flange 27 of the front side frame main unit facing toward the outer direction (the direction of the arrow a2), and a tire clearance portion 31 formed in a curved shape corresponding to steering of the front wheels 15.

The term "shape corresponding to steering of the front wheels 15" refers to members formed so as to prevent interference between an arm of a string device around the front wheels 15 which is not illustrated in the drawings, and the front side frame 21.

Figure 3:
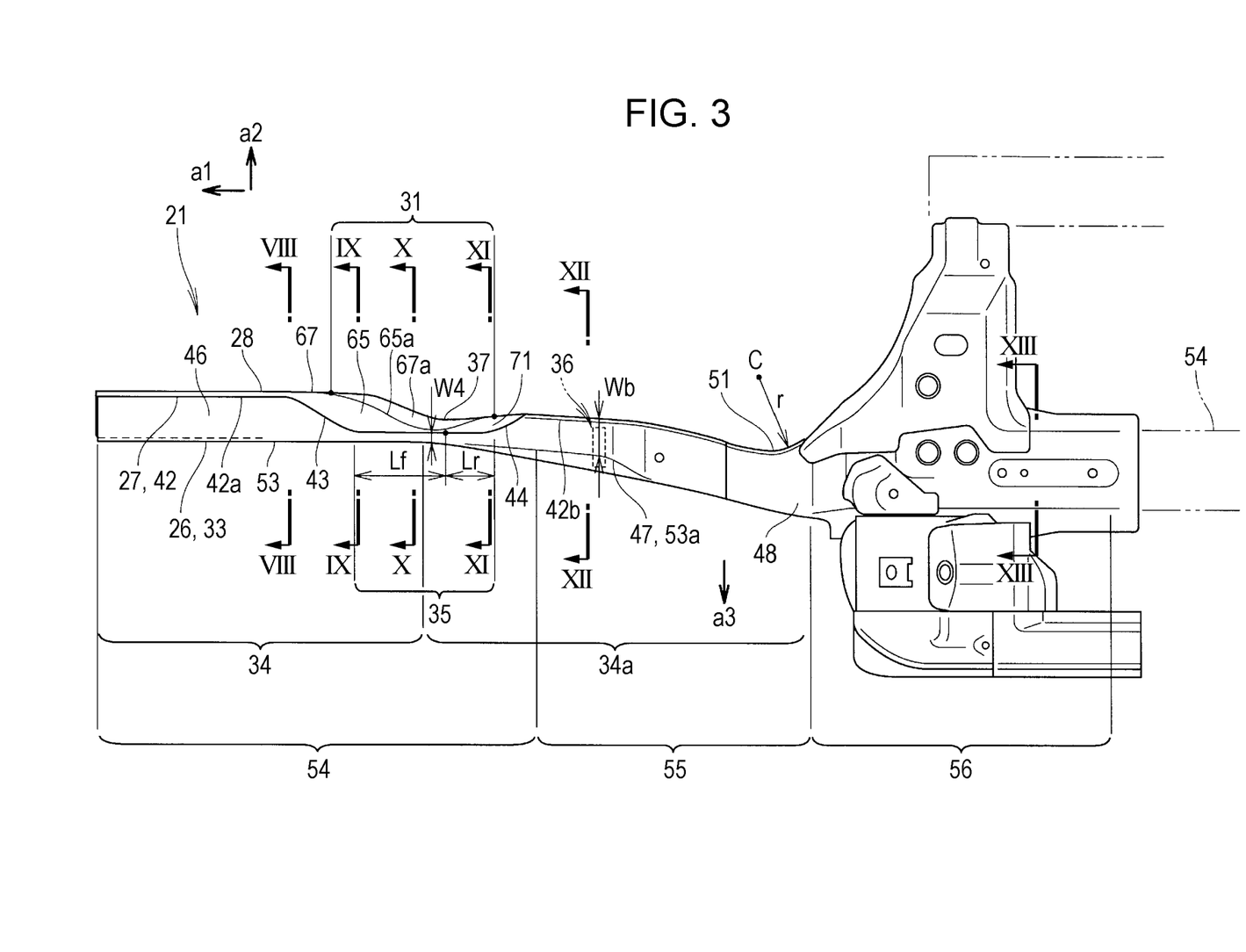
FIG. 3 is a view taken along arrow III in FIG. 1, illustrating a left front side frame according to the embodiment.
Figure 4:
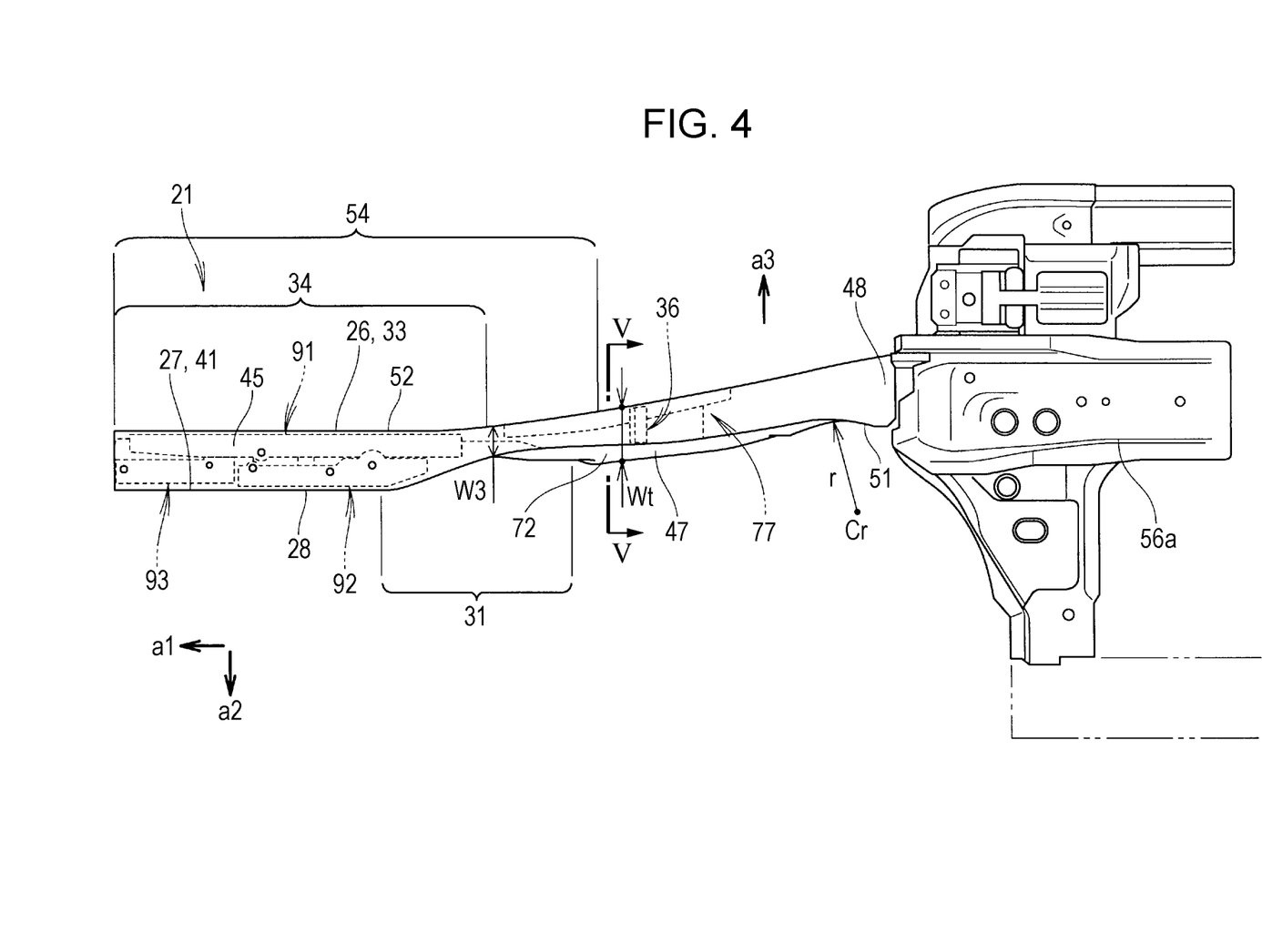
FIG. 4 is a plan view illustrating a left front side frame according to the embodiment.

As illustrated in FIGS. 3 and 4, the front side frame main unit 26 has a sidewall 33 facing the opening 25 formed into a sidewall straight portion 34 in an approximately straight line from the tip of the front side frame main unit 26 to the middle portion including the tire clearance portion 31.

The flange 27 of the front side frame main unit 26 has a flange straight portion 35 (FIG. 3) formed to the tire clearance portion 31, approximately parallel with the sidewall straight portion 34 of the sidewall 33. Also provided is a bulkhead 36 within the closed cross-section of the front side frame 21 and further back from the tire clearance portion 31.

Figure 10:
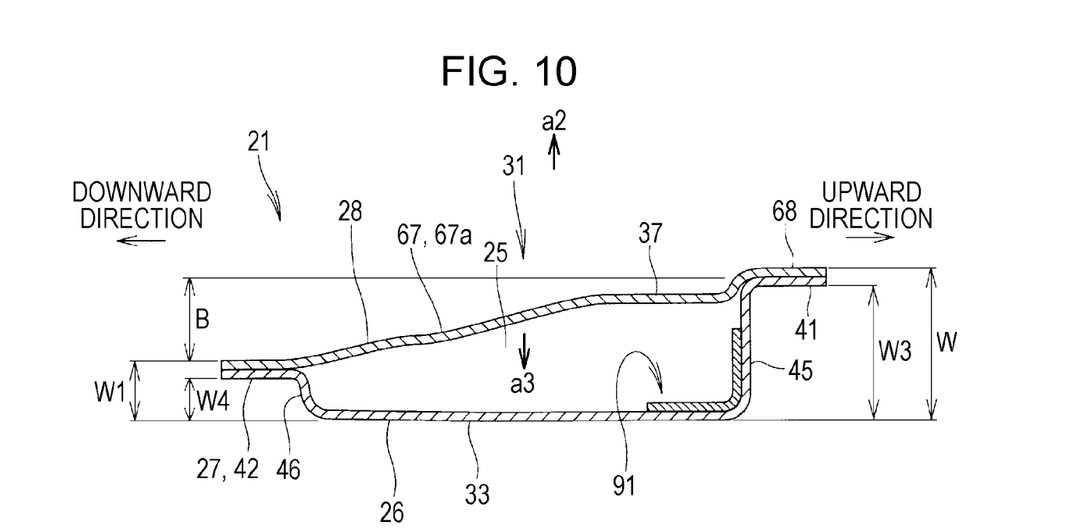
FIG. 10 is a cross-sectional view taken along line X-X in FIG. 3.

The tire clearance portion 31 has a curved shape where the back plate 28 is pressed in toward the inner side of the front side frame main unit 26 (the direction of the arrow a3) so as to be recessed, with the shape of the closed cross-section of the middle of the tire clearance portion 31 (middle portion 37 (FIG. 3)) at least has a generally triangular shape as illustrated in FIG. 10, with the width W of the shape of the closed cross-section tapering off to a width W1 from the upward direction of the vehicle 11 toward the downward direction thereof.

Figure 14:
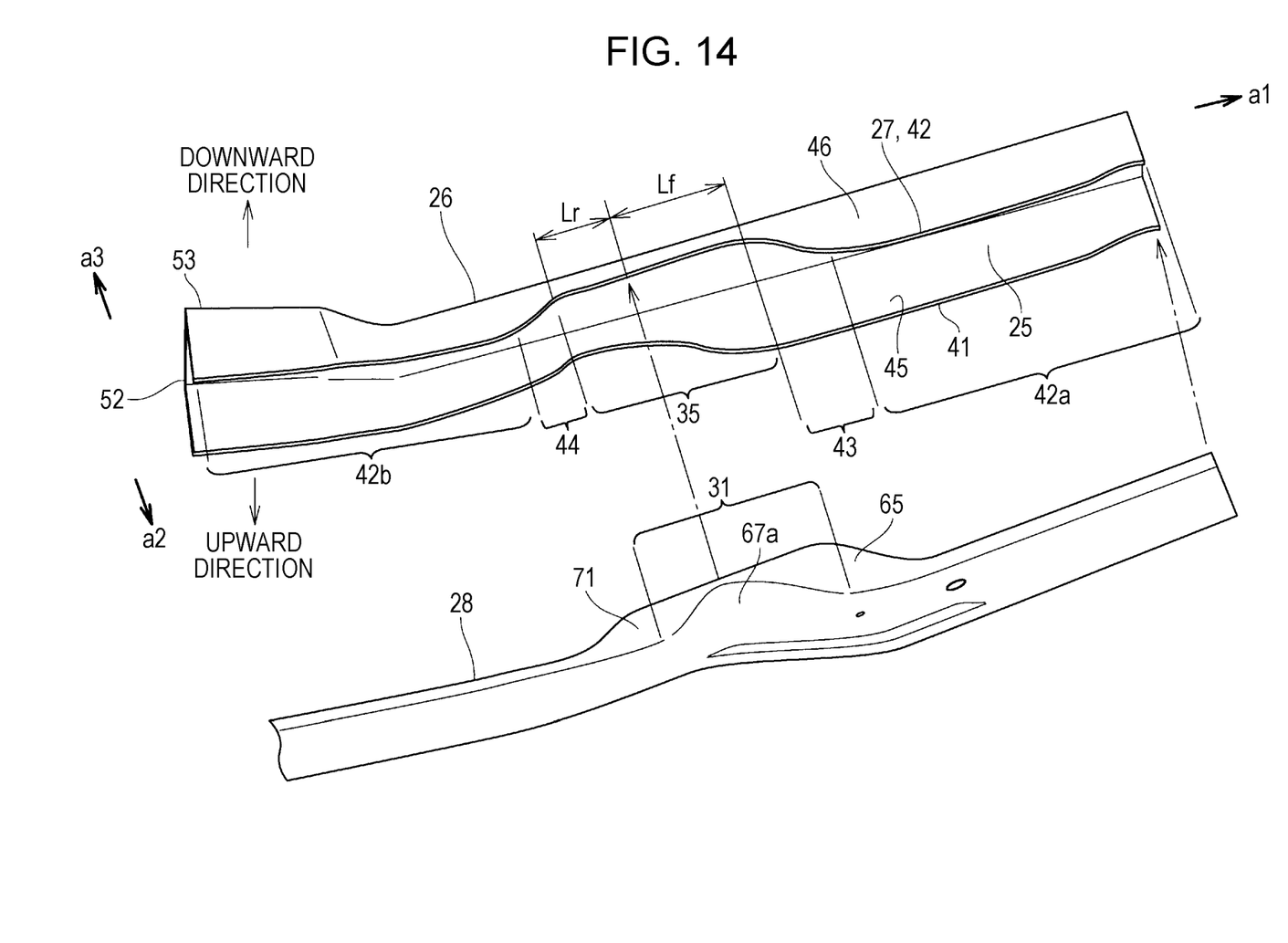
FIG. 14 is a perspective view of the front side frame main unit and back plate.

Also, the flange 27 of the front side frame main unit 26 is formed of an upper joint flange 41 extending upwards, and a lower joint flange 42 extending downwards. As illustrated in FIGS. 3 and 14, the lower joint flange 42 includes the flange straight portion 35 and flange transition portions 43 and 44 which are continuous with the flange straight portion 35 and continue to remaining lower joint flanges 42a and 42b (FIG. 14).

The front side frame main unit 26 also has a top 45 continuous with the sidewall 33, and a bottom 46 facing the top 45 and continuous with the sidewall 33. The bulkhead 36 is disposed around a middle bend portion 47 (FIG. 3), and is joined with the sidewall 33, top 45, and bottom 46.

Also, the front side frame 21 includes at a back portion 48 of the front side frame 21 near the passenger space 16, a base curved portion 51 formed by forming an inward recess (in the direction of the arrow a3), the center C of the radius (average radius) r of the curvature thereof being set on the outer side where the front wheel 15 is disposed. The base curved portion 51 is formed such that the cross-sectional area of the closed cross-section expands toward the passenger space 16.

The upper joint flange 41 is set such that a distance W3 (FIG. 10) from the sidewall 33 within the range of the tire clearance portion 31 is longer than a distance W4 from the sidewall 33 to the flange straight portion 35 of the lower joint flange 42.

Further, from a viewpoint viewing the front side frame 21 from directly above (the viewpoint in FIG. 4) or from directly below (the viewpoint in FIG. 3), the front side frame 21 has an upper ridge portion 52 and lower ridge portion 53 which are the corners of the sidewall 33 of the front side frame main unit 26, to form a front straight line portion 54 extending approximately in a straight line from the tip of the front side frame 21, and a curved portion 55 curved toward the direction where the sidewall 33 faces (the direction of the arrow a3), with a back straight line portion 56 formed continuous with the curved portion 55 and the front side frame main unit 26 and extending approximately in a straight line, so that the back straight line portion 56 continues to a floor frame 57 (FIG. 1) of the underbody 17 which is the floor.

Figure 13:
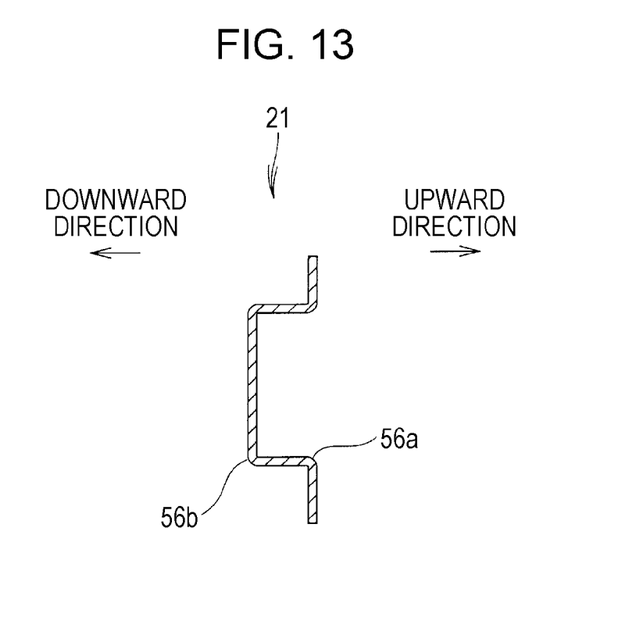
FIG. 13 is a cross-sectional view taken along line XIII-XIII in FIG. 3.

As illustrated in FIG. 13, the back straight line portion 56 has an upper ridge portion 56a continuous with the upper ridge portion 52 and a lower ridge portion 56b continuous with the lower ridge portion 53.

Next, the front side frame 21 will be described in detail. The front side frame 21 has defined the middle bend portion 47, and a front bend portion 61 which is a middle portion 37 and a back bent portion which is the base curved portion 51 to the front and back of the middle bend portion 47.

With the front side frame 21, as illustrated in FIGS. 2 and 4, due to the engine E being mounted with an east-west layout, the sidewall straight portion 34 of the sidewall 33 is formed in a straight line approximately parallel with a center line Ce of the width of the vehicle 11 in plan view (viewpoint in FIGS. 2 and 4), from the front end to around the middle portion. On the other hand, from the middle portion, a remaining sidewall straight portion 34a smoothly bends toward the center line Ce, with the back portion 48 and the base curved portion 51 of the front side frame 21 smoothly bending toward the center line Ce. The back plate 28 is formed approximately parallel to the sidewall 33, with the exception of the tire clearance portion 31.

Figure 9:
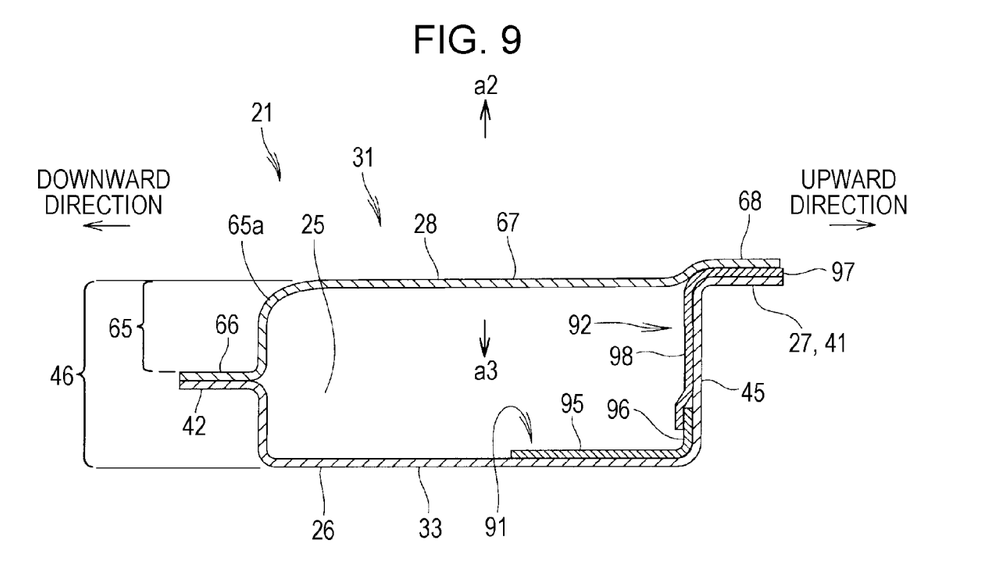
FIG. 9 is a cross-sectional view taken along line IX-IX in FIG. 3.

As illustrated in FIG. 9, the tire clearance portion 31 has a straight bottom 65 formed in front of the tire clearance portion 31, by plastic formation of the back plate 28. This straight bottom 65 is formed protruding outwards from the closed cross-section, from a lower joint edge 66 of the back plate 28, whereby the flange straight portion 35 can be formed. Continuous from the straight bottom 65, a plate clearance main unit 67 is extended toward the upper joint flange 41. An upper joint edge 68 is integrally formed with the plate clearance main unit 67, and is joined with the upper joint flange 41.

Also, as illustrated in FIG. 10, the tire clearance portion 31 has a clearance overhang portion 67a formed at the middle portion 37 of the tire clearance portion 31, formed by forming the plate clearance main unit 67 of the back plate 28 so as to overhang by a distance B. As a result, interface between the front side frame 21 and the arm of the steering device is prevented, and this also serves as a front bend portion.

The upper joint edge 68 is formed integrally layered with the clearance overhang portion 67a so as to form the upper joint flange 41. Note that the clearance overhang portion 67a smoothly continues to the straight bottom 65 (see FIG. 14).

Figure 11:
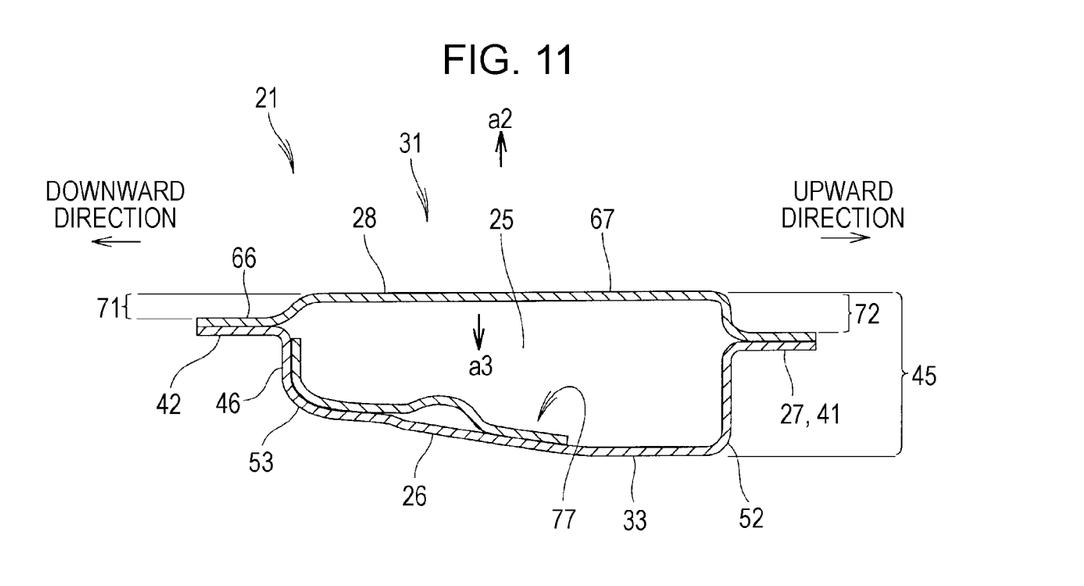
FIG. 11 is a cross-sectional view taken along line XI-XI in FIG. 3.

Further, as illustrated in FIG. 11, the tire clearance portion 31 has a straight bottom 71 and straight top 72 formed in back of the tire clearance portion 31, by plastic formation of the back plate 28. This straight bottom 71 is formed protruding outwards from the closed cross-section, from a lower joint edge 66 of the back plate 28, whereby the flange straight portion 35 can be formed.

Note that the straight bottom 71 smoothly continues to the clearance overhang portion 67a and the straight bottom 65 (see FIG. 14).

At the viewpoint viewing the front side frame 21 from directly beneath (the viewpoint in FIG. 3), the middle bend portion 47 has the lower ridge portion 53 extending backward approximately parallel to the center line Ce of the width of the vehicle 11 bent toward the center line Ce in a dogleg shape. We will refer to the lower ridge portion 53 of the middle bend portion 47 as "midway bend lower ridge portion 53a".

Figure 12:
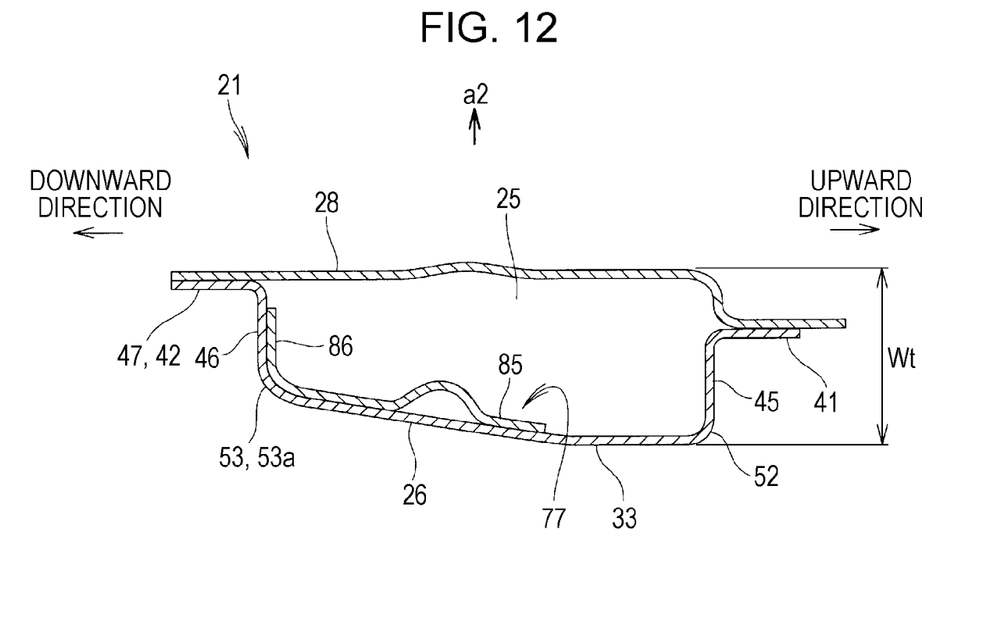
FIG. 12 is a cross-sectional view taken along line XII-XII in FIG. 3.

The middle bend portion 47 is also a portion where the width Wb of the bottom 46 has been set to the smallest, with the exception of the tire clearance portion 31. The width Wt (FIGS. 4 and 5) of the top 45, including the straight top 72, is set greater than the width Wb of the bottom 46, so at the middle bend portion 47 the back plate 28 is approximately perpendicular, and the sidewall 33 of the facing front side frame main unit 26 is inclined (FIGS. 4 and 12).

Figure 5:
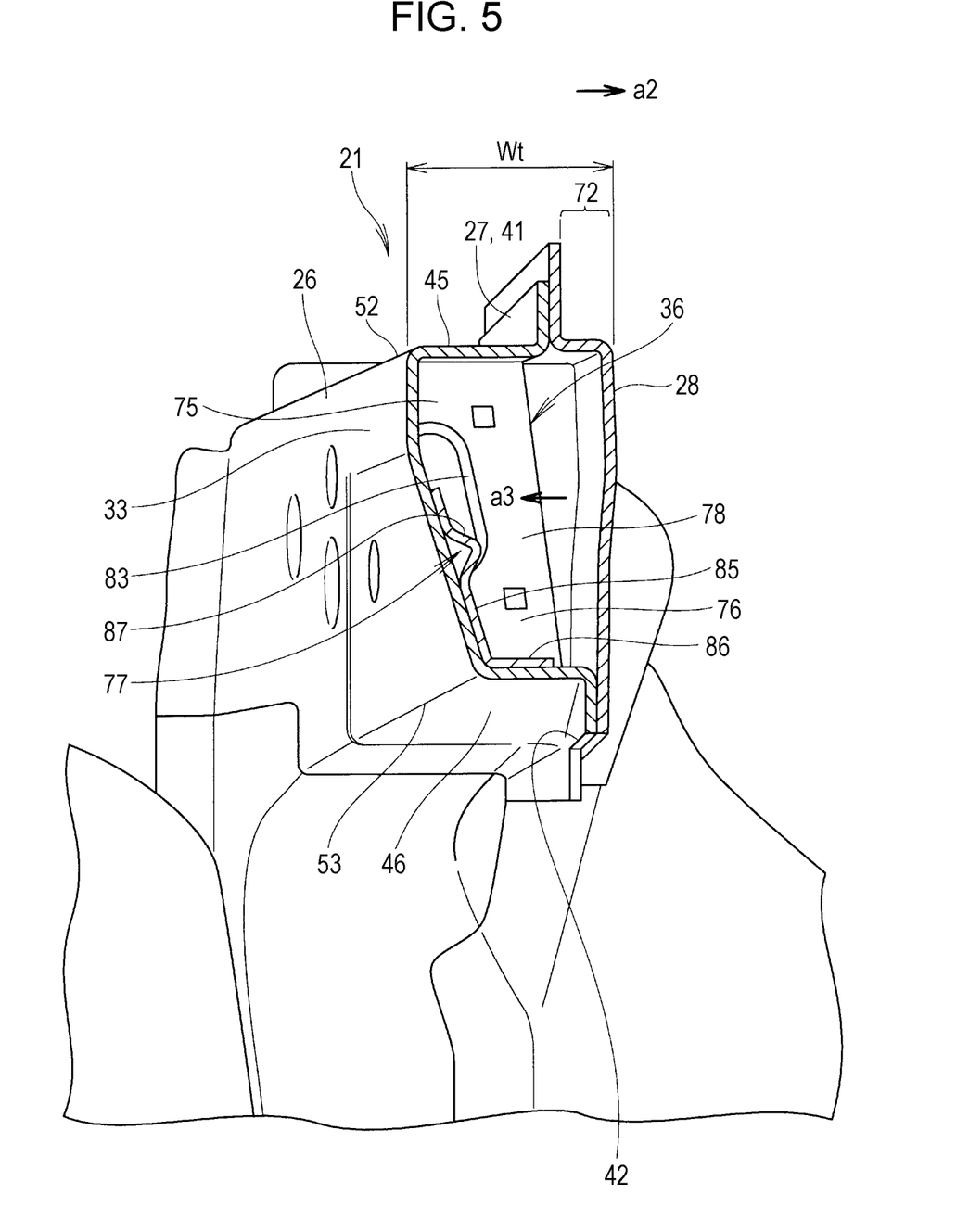
FIG. 5 is a cross-sectional view taken along line V-V in FIG. 4.
Figure 6:
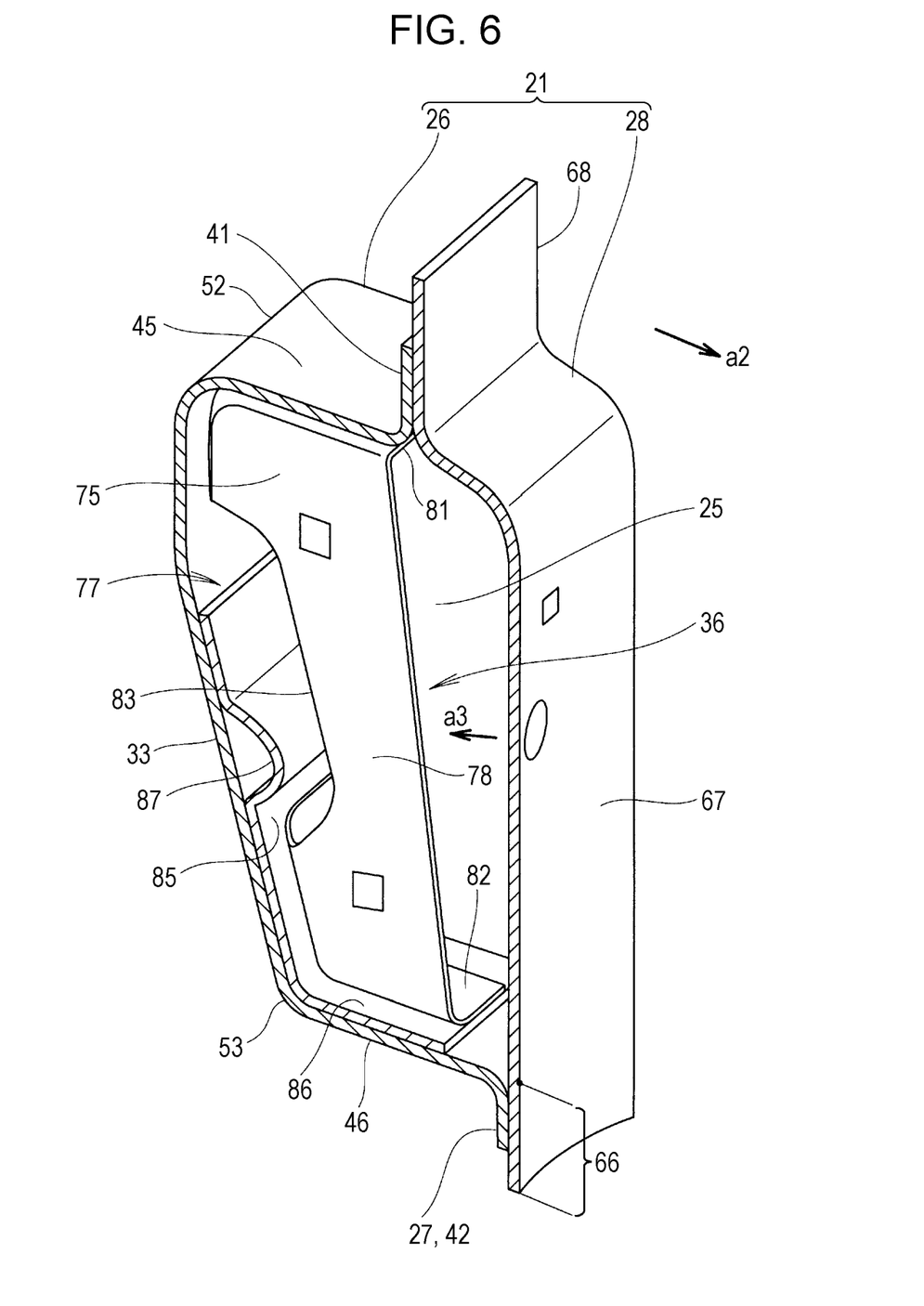
FIG. 6 is a cross-sectional view of the front side frame in a state with a bulkhead attached.
Figure 7:
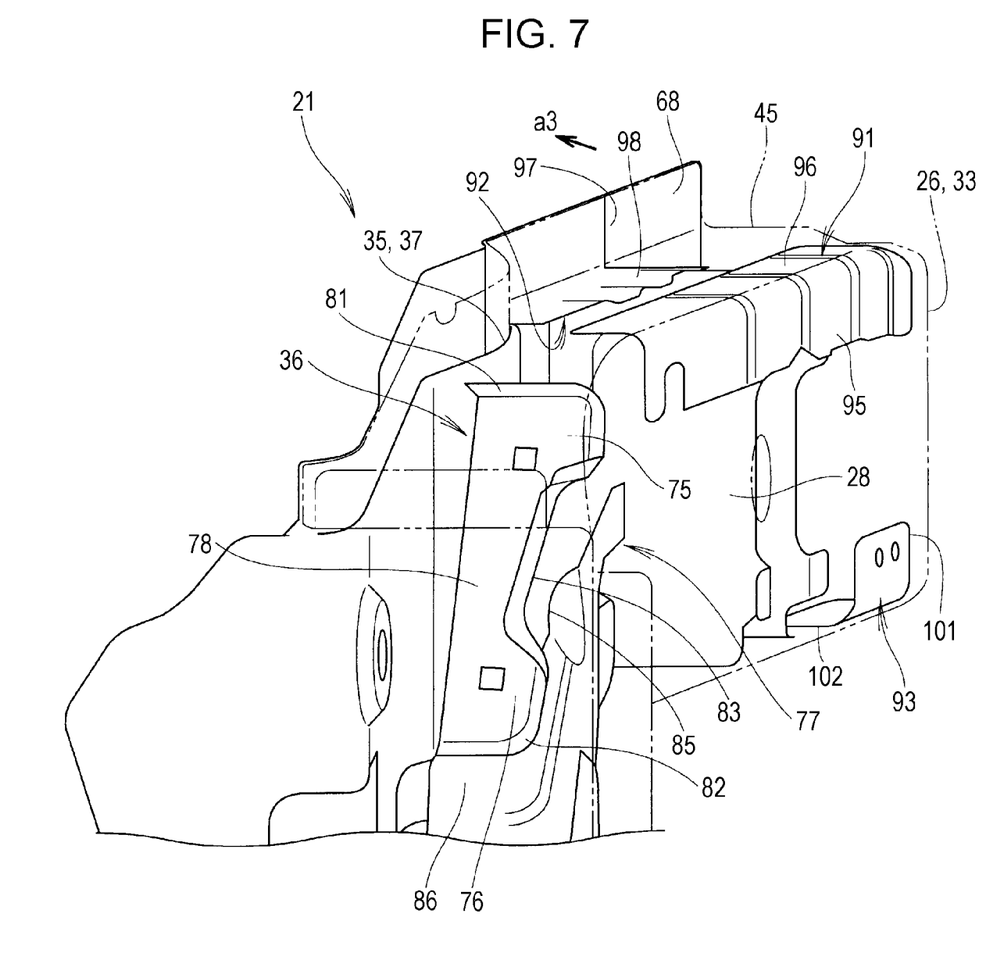
FIG. 7 is a transparent view of the front side frame through a front side frame main unit.
Figure 8:
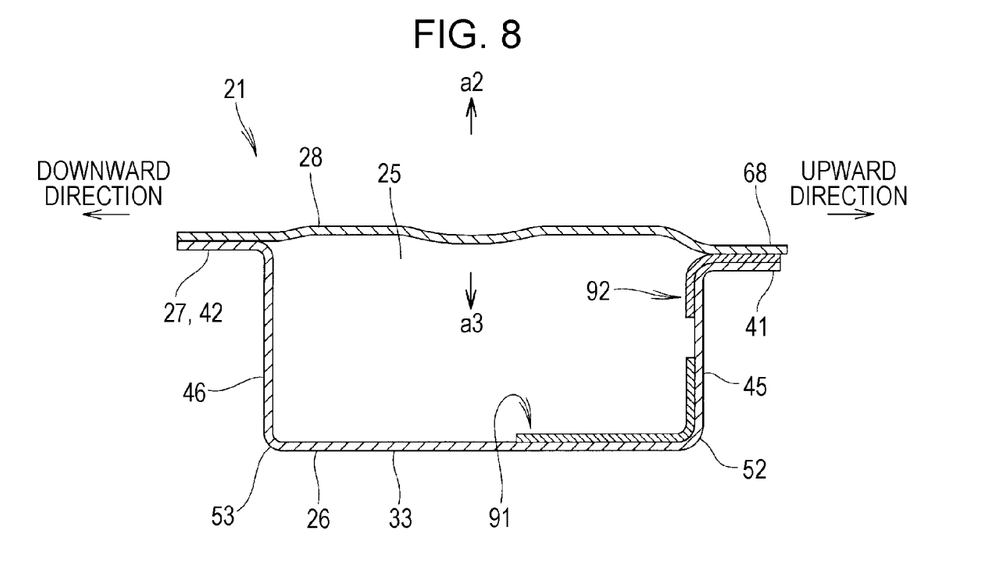
FIG. 8 is a cross-sectional view taken along line VIII-VIII in FIG. 3.

The bulkhead 36 is attached to the inner side of the middle bend portion 47. As illustrated in FIGS. 5 through 7, the bulkhead 36 fits within the front side frame main unit 26, the front side frame main unit 26 is joined with the top 75, and the bottom 76 is joined thereto having a first internal reinforcing member 77 therebetween.

Also, a partition 78 is formed to partition the interior thereof, and overlay joint portions 81 and 82 are formed continuous with the partition 78 and are oriented orthogonally thereto. A notch 83 through where the first internal reinforcing member 77 passes is formed at the middle of the partition 78 by notching out an edge portion at the middle of the partition 78 which is close to the sidewall 33.

The first internal reinforcing member 77 has an L-shaped cross-sectional shape, with a first plate portion 85 overlaid and joined at the inner face of the sidewall 33, and a second plate portion 86 overlaid and joined at the inner face of the bottom 46. The length of the first internal reinforcing member 77 is equivalent to the distance from the middle portion 37 of the tire clearance portion 31 to the middle between the middle bend portion 47 and the back bend portion (base curved portion 51). The first plate portion 85 has a groove 87 protruding toward the inner side of the closed cross-section.

In addition to the first internal reinforcing member 77, the front side frame 21 includes therein a second internal reinforcing member 91, third internal reinforcing member 92, and fourth internal reinforcing member 93.

The second internal reinforcing member 91 has an L-shaped cross-sectional shape, with a first plate portion 95 overlaid and joined at the inner face of the sidewall 33, and a second plate portion 96 overlaid and joined at the inner face of the top 45. The length of the second internal reinforcing member 91 is equivalent to the distance from the middle portion 37 of the tire clearance portion 31 to the tip.

The third internal reinforcing member 92 has an L-shaped cross-sectional shape, with a first plate portion 97 being overlaid and joined having been introduced between the upper joint flange 41 and the upper joint edge 68 of the back plate 28 (FIG. 9), and a second plate portion 98 overlaid and joined at the inner face of the top 45. The length of the third internal reinforcing member 92 is equivalent to the distance from the front of the tire clearance portion 31 to the middle between the front of the tire clearance portion 31 and the tip.

The fourth internal reinforcing member 93 has an L-shaped cross-sectional shape, with a first plate portion 101 overlaid and joined at the inner face of the sidewall 33, and a second plate portion 102 overlaid and joined at the inner face of the bottom 46. The length of the fourth internal reinforcing member 93 is equivalent to the distance from the tip of the front side frame 21 to the middle between the front of the tire clearance portion 31 and the tip of the front side frame 21.

Figure 15:
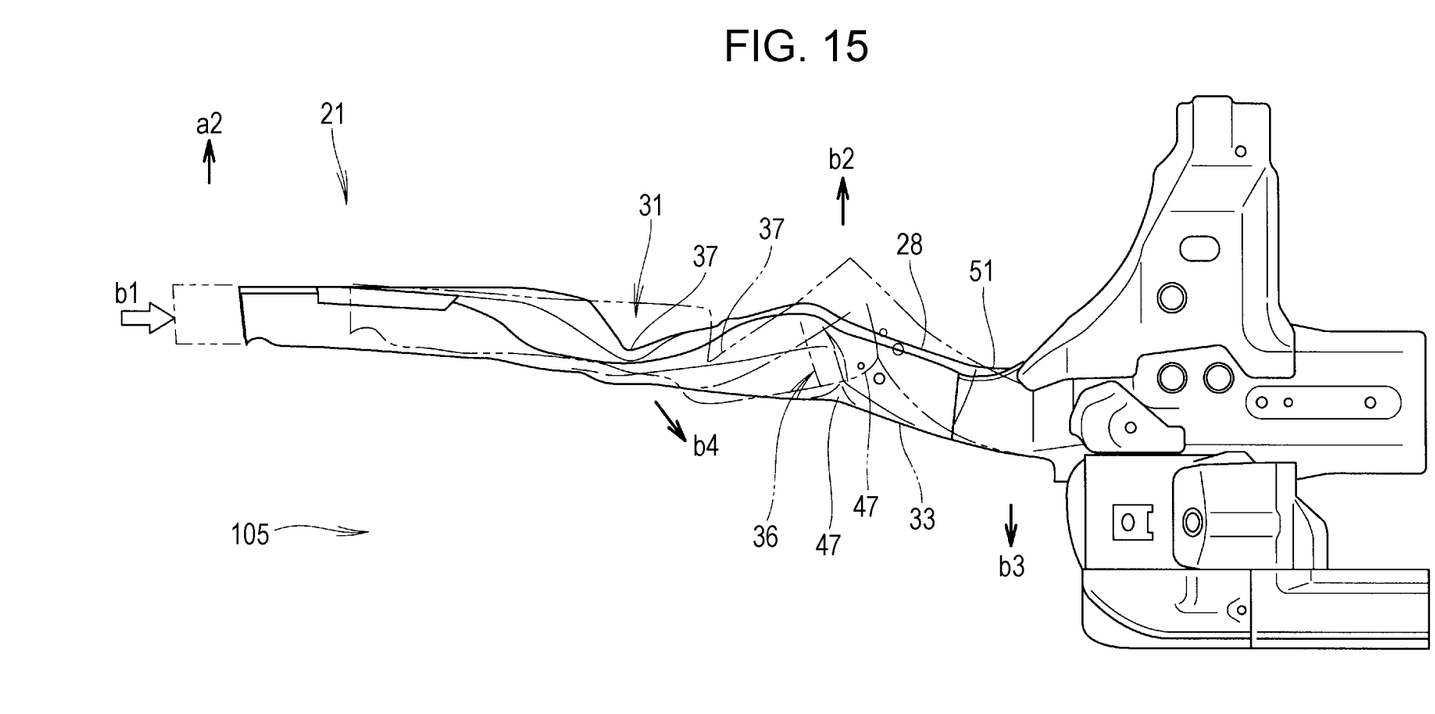
FIG. 15 is an operational diagram illustrating the shock absorbing mechanism of the structure for a front portion of a vehicle body according to the embodiment.

Next, the operation of the front portion structure of a vehicle body (vehicle body front portion mechanism 13) will be described. The mechanism of the structure for a front portion of a vehicle body absorbing shock at the time of an offset collision will be described with reference to FIG. 15 in particular. FIG. 15 is a diagram drawn using a copy of FIG. 3, and is from the same viewpoint as FIG. 3.

As illustrated in FIG. 15, with the front portion structure of a vehicle body, upon the load of shock of an offset collision being input to the front of the vehicle 11 as indicated by the arrow b1, first, the middle bend portion 47 starts to bend. Next, almost simultaneously, the front bend portion (middle portion 37) and back bend portion (base curved portion 51) start to bend, so the front side frame 21 can be smoothly bent into three, thereby improving shock absorption.

Specifically, upon the load of an offset collusion being transmitted to the front side frame 21, as described above the load (stress) concentrated on the lower ridge portion 53 and bottom 46 of the middle bend portion 47 reaches the greatest due to the dogleg midway bend lower ridge portion 53a and bottom 46 with the narrow width Wb, so the middle bend portion 47 starts to bend with the sidewall 33 being valley folded, such that the middle bend portion 47 is pushed outward from an engine room 105 as indicated by the arrow b2.

As the middle bend portion 47 bends and moves outwards in the direction of the arrow b2, the load which has increased due to the distance of movement of the middle bend portion 47 (increased load occurring (moment) which acts in the bending direction (arrow b2)) is applied to the back bend portion (base curved portion 51), so the back plate 28 of the back bend portion (base curved portion 51) is bent such that the back plate 28 is valley folded, and the back bend portion (base curved portion 51) starts to bend so as to be pushed in toward the engine room 105 as indicated by the arrow b3.

At approximately the same timing that the back bend portion (base curved portion 51) starts to bend, the front bend portion (middle portion 37 of the tire clearance portion 31) starts to bend. The load increased due to the distance of movement of the middle bend portion 47 (increased load occurring which acts in the bending direction) is applied to the front bend portion (middle portion 37), so the back plate 28 of the front bend portion (middle portion 37) is bent such that the back plate 28 is valley folded, and the front bend portion (middle portion 37) starts to bend so as to be pushed in toward the engine room 105 as indicated by the arrow b4. Consequently, the front side frame 21 can be smoothly bent into three as indicated by the two-dot dashed line, thereby improving shock absorption.

At the tire clearance portion 31 including the front bend portion (middle portion 37 of the tire clearance portion 31), the ridge 65a of the straight base portion 65 is curved. The flange straight portion 35 is extended forward and backward from the middle portion 37 of the tire clearance portion 31 by appropriate distances Lf and Lr (FIG. 14) such that the shape of the lower joint flange 42 approximately does not match this curved shape, so concentration of stress which occurs at the lower joint flange 42 situated at the middle portion 37 of the tire clearance portion 31 can be reduced. In other words, concentration of stress does not occur as readily.

Also, by disposing the bulkhead 36 within the closed cross-section close to the bend portion (middle bend portion 47) of the front side frame 21, collapsing of the cross-sectional shape near the bend portion which occurs at the time of bending the front side frame 21 can be suppressed, and load occurring (moment) which acts on the bending direction occurring in the processed of bending, can be increased.

The structure for a front portion of a vehicle body according to the present disclosure is suitable for application to automobiles. The present disclosure is not limited to the above-described embodiment. Variations and modifications may be made without departing from the scope of the present disclosure.

We claim:

1. A front portion structure of a vehicle body comprising:
a front side frame extending forward from a front portion of a floor of a passenger space and disposed close to a front wheel, the front side frame including:
a front side frame main unit including a substantially hat shape in cross-section wherein the hat shape includes a flange and an opening facing an outer direction in a vehicle width direction where a front wheel is placed,
a back plate layered with and joined with the flange facing toward the outer direction to form a closed cross-section with the front side frame main unit,
a tire clearance portion formed in a curved shape corresponding to steering of the front wheel, and
a bulkhead disposed at the rear of the tire clearance portion within the closed cross-section of the front side frame;
wherein the front side frame main unit includes a sidewall facing the opening and formed in an substantially straight line from a front end of the front side frame main unit to a middle portion including the tire clearance portion;
and wherein the flange includes a flange straight portion formed in the tire clearance portion, substantially parallel with the sidewall.

2. The front portion structure of the vehicle body according to claim 1,
wherein the back plate includes a curved shape in the tire clearance portion, formed by pressing the back plate in toward the inner side of the front side frame main unit so as to be recessed such that the shape of the closed cross-section of the tire clearance portion includes a substantially triangular shape such that a width of the shape of the closed cross-section tapers toward the downward direction thereof;
and wherein the flange includes
an upper joint flange extending upwards, and
a lower joint flange extending downwards and including the flange straight portion.

3. The front portion structure of the vehicle body according to claim 1,
wherein the front side frame includes a middle bend portion, and
wherein the front side frame main unit includes
a top portion disposed continuous with the sidewall, and
a bottom portion opposite to the top portion and disposed continuous with the sidewall;
wherein the bulkhead is disposed around the middle bend portion, and is joined with the sidewall, the top portion, and the bottom portion.

4. The front portion structure of the vehicle body according to claim 1,
wherein the front side frame includes a base curved portion disposed at a back portion of the front side frame around the passenger space, the base curved portion being formed by an inward recess, the center of the radius of the curvature thereof being placed on the outer side where the front wheel is disposed, with the base curved portion being formed such that the cross-sectional area of the closed cross-section gradually expands toward the passenger space.

5. The front portion structure of the vehicle body according to claim 2,
wherein the upper joint flange is set such that a distance from the sidewall within the range of the tire clearance portion is longer than a distance from the sidewall to the flange straight portion of the lower joint flange.

6. The front portion structure of the vehicle body according to claim 1,
wherein the front side frame includes an upper ridge portion and a lower ridge portion which are the corners of the sidewall of the front side frame main unit viewed from directly above or directly below, respectively, the upper ridge portion and the lower ridge portion form a front straight line portion extending substantially in a straight line from the front end of the front side frame, and a curved portion curved toward the direction where the sidewall faces, with a back straight line portion formed continuously with the upper ridge portion and the lower ridge portion of the curved portion and extending substantially in a straight line, such that the back straight line portion is continuous with a floor frame of the floor.

7. The front portion structure of the vehicle body according to claim 1,
wherein the lower joint flange further includes a flange transition portion continuously disposed between the flange straight portion and a remaining lower joint flange.

8. The front portion structure of the vehicle body according to claim 4,
wherein the front side frame includes a middle bend portion, and
wherein the middle bend portion includes a recess recessed toward the outer direction of the vehicle width direction, the tire clearance portion includes a recess recessed toward an inner direction of the vehicle width direction, and the base curved portion includes a recess recessed toward the inner direction of the vehicle width direction.

* * * * *